Figure 1:
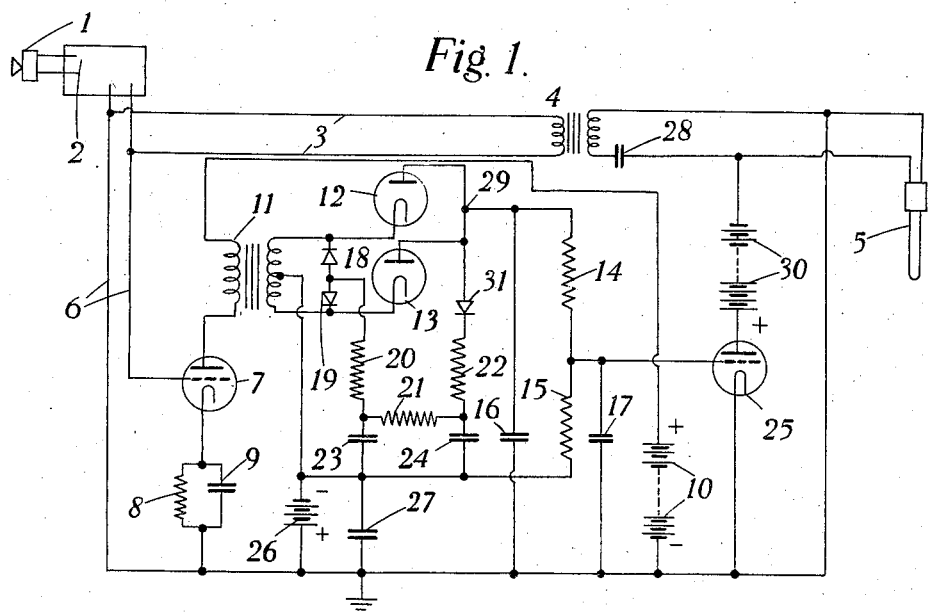

Dec. 13, 1938.     A. POULSEN ET AL     2,140,300
PHOTOGRAPHIC SOUND RECORD AND RECORDING
Filed Sept. 15, 1937

INVENTORS
Arnold Poulsen,
O. K. Kolb, A. S. Pratt
and D. W. Boston
BY
Paul Kolisch
ATTORNEY Patented Dec. 13, 1938

2,140,300

UNITED STATES PATENT OFFICE 2,140,300

PHOTOGRAPHIC SOUND RECORD AND RECORDING

Arnold Poulsen, Charlottenlund, near Copenhagen, Denmark, and Otto Kurt Kolb, Albert Stanley Pratt, and David Whitehead Boston, London, England, assignors to British Acoustic Films Limited, London, England, a company of Great Britain Application September 15, 1937, Serial No. 163,938
In Great Britain November 17, 1936

7 Claims. (Cl. 179—100.3)

This invention relates to photographic sound records and to methods and apparatus for producing such records.

In producing photographic sound records on a film by means of an electro-optical recording device, proposals have been made to avoid or reduce the so-called background noise which is caused by irregularities in the transparent part of the film and is directly proportional to the light passing through the film. With this end in view, it has been suggested to arrange the recording apparatus so as to produce a record such that during recording periods of low sound amplitude the film is of low mean transparent width in the case of a variable width type or of low mean transparency in the case of a variable density type, the mean transparent width or mean transparency increasing according to the amplitude of the sound to be recorded. This method of procedure results in the reduction of background noise during periods of low sound intensity and the records produced are known as "noiseless" records. In making photographic sound films by these methods, a portion of the electrical phonic energy, that is to say the alternating current corresponding with the sound waves to be recorded, is rectified and the rectified output is applied either directly or through amplifying and smoothing circuits to the recording device or to an auxiliary element such as a shutter to provide an increase in the mean transparent width or mean transparency of the positive film as the amplitude of the recorded sound increases.

It has not been found practicable, however, to reduce the mean transparent width or the mean transparency of the film below a certain finite value since it is necessary that sound waves of very small amplitude which may not change the rectified bias or shift current appreciably may be recorded without distortion or discontinuity.

The residual background noise will be least objectionable if it appears to the ear to be of constant level. However, the sensitivity of the human ear is reduced when it is subjected to loud sounds according to the intensity of the sound and to a secondary degree according to the duration of the sound. Furthermore, the ear takes an appreciable time to recover its sensitivity after the sound ceases, this time of recovery depending upon the loss of sensitivity and therefore upon the intensity and duration of the preceding sounds.

The main purpose of the present invention is to provide a method of and an electrical system for producing photographic sound records of the noiseless type in which the mean transparent width or mean transparency may be varied in such a way that in reproduction, the apparent level of the background noise is constant.

Thus, one object of the invention consists of an electrical system comprising apparatus for producing photographic sound records of the noiseless type in which the rectified energy derived from the phonic current is supplied to the optical means consisting of the recording oscillograph or additional electro-optical device, to provide a shift current or voltage to control the mean transparent width or mean transparency of the record from a plurality of circuits including energy storage devices having different charging time constants, so that the recovery curve of the shift current or voltage upon the reduction of sounds of an appreciable intensity is dependent for an interval of time upon the discharge of an energy storage device which is more rapidly charged than a second energy storage device and subsequently upon the slower discharge of the said second storage device which is more slowly charged, the change over taking place at a valve of the shift or bias which is dependent upon the charge acquired by said second storage device. The expression "recovery curve of the shift current or voltage" referred to above is intended to refer to the curve showing the change in shift current or voltage plotted with respect to time when a recorded sound of appreciable intensity wholly or partly falls away.

A further object of the present invention consists of an electrical system comprising two circuits one designed to have a relatively short time constant and the other to have a relatively long time constant, said circuits being supplied through separate rectifying devices and both to be connected to the optical means. In such a case, a further rectifier may be provided to separate the said two circuits and connected in such a way that current from the rectifying device supplying the circuit with the shorter time constant is prevented from affecting the circuit having the longer time constant.

The invention will now be more fully described with reference to the annexed drawing, in which:—

Figure 2:
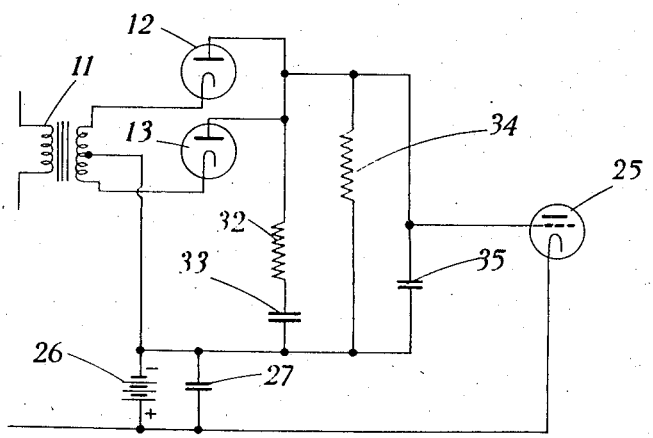

Figure 1 is a circuit diagram of a system for producing photographic sound records according to the invention; and Figure 2 shows a modified embodiment of part of the circuit shown in Figure 1.

In Figure 1 of the drawing, a microphone 1 is connected to an amplifier 2, the output of which is connected by conductors 3 to the primary winding of a transformer 4, the secondary winding of which feeds the audio-frequency currents corresponding with the sound waves to be recorded to the recording device which in this case is shown as a mirror oscillograph 5. The output terminals of the amplifier 2 are also connected by conductors 6 between the grid and cathode of an amplifying tube 7, provided in its grid circuit with an arrangement for yielding a suitable grid bias and consisting of a condenser 9 shunted by a resistance 8. The anode of the tube 7 has its high tension source in the form of the battery 10 and the anode circuit is coupled through a transformer 11 to two diode tubes 12, 13 which form a full wave rectifier. The rectified ouput from the tubes 12, 13 is passed to a smoothing filter circuit consisting of resistances 14, 15 and condensers 16, 17 connected as shown.

A pair of rectifiers 18 and 19 also providing full wave rectification are also connected across the secondary winding of the transformer 11 and the rectified output is passed to a smoothing filter circuit consisting of resistances 20 and 21 and condensers 23 and 24. The two filter circuits are separated by a resistance 22 and a further rectifier 31, the latter being connected to prevent current flowing from the upper plate of the condenser 24 to the anodes of the tubes 12, 13 which would otherwise cause the accumulation of an undesirable negative charge on the upper plate of the condenser 24.

The output from the smoothing filter circuit consisting of resistances 14, 15 and condensers 16, 17 is applied to the grid of a further tube 25, the grid of which is biased by a battery 26 shunted by a by-pass condenser 27. The positive terminal of the battery 26 and the cathode of the tube 25 are shown as directly grounded. The battery 30 is shown to serve as the high tension anode source for the tube 25 and the anode current from this tube is also passed through the optical means 5 to produce the necessary shift, a blocking condenser 28 being provided to prevent the anode current from the tube 25 from flowing in the secondary winding of the transformer 4.

The operation of the system shown in Figure 1 is substantially as follows: In the absence of a sound to be recorded there is no rectified current and the voltage at the point 29 and consequently the voltage of the grid of tube 25 is the same as that of the negative terminal of the bias battery 26. When an alternating current corresponding to a sound to be recorded is set up in the secondary winding of the transformer 11, it is rectified by the two diode tubes 12, 13 so that the voltage at the point 29 and therefore that of the grid of the tube 25 falls with respect to ground and the cathode of tube 25, so that the shift current in the anode circuit of the tube 25 is reduced and consequently opens up the sound track on the record, or in other words, increases the mean transparent width in the case of a variable width record, or the mean transparency in the case of a variable density record.

The diode tubes 12, 13 and the components of the smoothing filter circuit following it are arranged to have a relatively short charging time constant so that at commencement of the recording of a sound, the sound track opens rapidly and the initial waves are fully recorded. During the recording of a sound while the track is held open rectification also takes place in the rectifiers 18, 19 followed by the smoothing filter consisting of the resistances 20, 21 and condensers 23, 24 and as the charging time constant of this circuit is considerably longer than that of the first filter circuit 14, 15, 16, 17, the upper plate of the condenser 24 during recording is being charged negatively at a comparatively slow rate. Therefore, when the recorded sound ceases, the negative charge on the upper plate of the condenser 24 which controls the shape of the recovery curve of the shift current or voltage depends not only upon the intensity of the sound, but also upon its duration.

When the sound ceases, the voltage of the grid of the tube 25 rises relatively quickly, as the condensers 16 and 17 discharge through the resistances 14 and 15 that is through a discharging circuit having a comparatively short time constant. When the voltage of the upper plate of the condenser 16 rises as high as that of the upper plate of the condenser 24, the rectifier 31 conducts, and the discharging circuit then consists of the condensers 23, 24, 16 and 17, and the resistances 21, 22, 14 and 15, which circuit has a relatively long time constant. After the cessation of a given sound, the point at which the recovery curve of the shift or bias becomes dependent upon the combined circuit having the relatively longer time constant is dependent upon the voltage acquired by the condenser 24 and therefore upon the charging circuit of this condenser, consisting of the resistances 20 and 21 and the condenser 23 fed from the rectifiers 18 and 19. Thus, by suitable choice of the time constant of the charging circuit for the condenser 24, the value of the shift when the slower discharge commences, and therefore of the background noise, may be made to compensate for the reduction of sensitivity of the human ear due to the preceding sounds. Also, by a suitable choice of the time constant of the combined discharging circuit, the rate of the subsequent reduction of the background noise due to closing of the track may be made sufficiently slow to compensate for the recovery of sensitivity of the human ear. The rectifier 31 prevents current flowing from the upper plate of the condenser 24 to the anodes of the two diodes 12 and 13, which current would cause the accumulation of an undesired negative charge on the upper plate of condenser 24, from the anodes of the diodes 12, 13 as soon as rectification started.

In the modified embodiment shown in Figure 2, in which the same reference numerals are used for corresponding parts as in Figure 1, only one full wave rectifier represented by the diode tubes 12, 13 is provided. It is followed by a circuit consisting of a resistance 34 and a condenser 35 in parallel which is the circuit of relatively short time constant so that the condenser 35 charges up quickly, thus providing for rapid opening of the sound track upon initiation of recording. A circuit of relatively long time constant which consists of a resistance 32 in series with a condenser 33 is also connected across the rectifier 12, 13 and therefore the condenser 33 is only charged up relatively slowly. When the phonic input is reduced or removed, the condenser 35 commences to discharge relatively quickly through the resistance 34, but when its voltage has fallen to that of the condenser 33, the rate of the increase of voltage on the grid of the tube 25 is reduced, being dependent upon the longer time constant of the whole circuit comprising the condensers 33 and 35 and the resistances 32 and 34.

We claim:—

1. Apparatus for producing photographic sound records, comprising optical means for directing a variable light beam on to a recording surface, means for supplying to said optical means an alternating current corresponding with the sound waves to be recorded and a direct shift current in accordance with said sound waves and a plurality of circuits including electrical energy storage devices having different charging time constants and connected between said second-named means and said optical means and arranged so that the recovery curve of the shift current or voltage upon the reduction in amplitude of a sound of an appreciable amplitude is dependent for an interval of time upon the relatively rapid discharge of one of said energy storage devices which is more rapidly charged than a second of said energy storage devices and is subsequently dependent upon the slower discharge of said second energy storage device which is more slowly charged, the magnitude of the shift current or voltage at which the change-over in conditions takes place being dependent upon the charge acquired by said second energy storage device.

2. Apparatus for producing photographic sound records, comprising optical means for directing a variable light beam on to a recording surface, a source of alternating current corresponding with the sound waves to be recorded, a rectifier connected to said source and a plurality of circuits including electrical energy storage devices having different charging time constants and connected between said rectifier and said optical means and arranged so that the recovery curve of the shift current upon the reduction in amplitude of a sound of an appreciable amplitude is dependent for an interval of time upon the relatively rapid discharge of one of said energy storage devices which is more rapidly charged than a second of said energy storage devices and is subsequently dependent upon the slower discharge of said second energy storage device which is more slowly charged, the magnitude of the shift current or voltage at which the change-over in conditions takes place being dependent upon the charge acquired by said second energy storage device.

3. Apparatus for producing photographic sound records, comprising optical means for directing a variable light beam on to a recording surface, a source of alternating current corresponding with the sound waves to be recorded, a transformer connected to said source, a full-wave rectifier connected across the secondary winding of said transformer, a circuit including an electrical energy storage device having a relatively short charging time constant connected between said rectifier and said optical means to permit recording of initial waves of a sound to be recorded with minimum delay and distortion, a second full-wave rectifier connected across the secondary winding of said transformer and a circuit including a second electrical energy storage device having a relatively long charging time constant connected between said second rectifier and said optical means in order to cause the recovery of the rectified shift current upon the reduction in amplitude of a sound of an appreciable amplitude to be dependent for an interval of time upon the relatively rapid discharge of one of said energy storage devices which is more rapidly charged than a second of said energy storage devices and is subsequently dependent upon the slower discharge of said second energy storage device which is more slowly charged, the magnitude of the shift current or voltage at which the change-over in conditions takes place being dependent upon the charge acquired by said second energy storage device.

4. Apparatus for producing photographic sound records, comprising optical means for directing a variable light beam on to a recording surface, means for supplying to said optical means an alternating current corresponding with the sound waves to be recorded and a direct shift current in accordance with said sound waves and a plurality of circuits including electrical energy storage devices having different charging time constants and connected between said second-named means and said optical means, said circuits and said energy storage devices being selected so that upon the reduction in amplitude of a sound wave of an appreciable amplitude, the mean transparency of the record is influenced in such a manner that, in reproduction, the level of background noise appears substantially constant to the ear.

5. Apparatus for producing photographic sound records comprising optical means for directing a variable light on to a recording surface, a source of alternating current corresponding with the sound waves to be recorded, a rectifier connected to said source, a circuit including an electrical energy storage device having a relatively short charging time constant connected between said rectifier and said optical means to permit recording of initial waves of sound to be recorded with minimum delay and distortion, a second rectifier connected to said source, a circuit including a second electrical energy storage device having a relatively long charging time constant connected between said second rectifier and said optical means in order to delay the recovery of the rectified shift current upon the reduction in amplitude of a sound of appreciable amplitude and a further rectifier connected to separate said energy storage device having a relatively short charging time constant from said energy storage device having a relatively long charging time constant to prevent said former device affecting said latter device.

6. A method of producing a photographic sound record of the noiseless type which comprises exposing a sensitive film to a beam of light, varying the beam of light in accordance with the waveform of the sound being recorded, rapidly moving the zero of the beam from its normal position upon the initiation of sound waves of appreciable amplitude and causing the zero of the beam to recover upon the reduction of a sound of an appreciable amplitude, at a rate dependent both upon the duration and amplitude of said sound.

7. A sound record consisting of a film having a sound track containing a variable width photographic record of sound waves, the axis of the record varying in position relatively to one side of the sound track in accordance with the sound waves being recorded, said axis departing from the normal position corresponding to no sound rapidly upon the initiation of sound waves of appreciable amplitude and returning to said normal position upon the reduction of a sound of an appreciable amplitude at a rate dependent both upon the duration and amplitude of said sound.

ARNOLD POULSEN.
OTTO KURT KOLB.
ALBERT STANLEY PRATT.
DAVID WHITEHEAD BOSTON.